United States Patent
Tanaka et al.

(10) Patent No.: US 8,820,787 B2
(45) Date of Patent: Sep. 2, 2014

(54) KNEE BOLSTER OF VEHICLE

(71) Applicant: Mazda Motor Corporation, Hiroshima (JP)

(72) Inventors: Kazuhiro Tanaka, Hiroshima (JP);
Yasushi Fujikura, Hiroshima (JP);
Tomoshi Mitsunari, Hiroshima (JP);
Ryusuke Asahi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/777,961

(22) Filed: Feb. 26, 2013

(65) Prior Publication Data

US 2013/0241185 A1    Sep. 19, 2013

(30) Foreign Application Priority Data

Mar. 13, 2012  (JP) .................................. 2012-056105

(51) Int. Cl.
 *B60R 21/045*  (2006.01)
 *B60R 21/00*  (2006.01)
 *B60R 21/02*  (2006.01)

(52) U.S. Cl.
 CPC ....... *B60R 21/045* (2013.01); *B60R 2021/0051* (2013.01); *B60R 2021/0233* (2013.01); *B60R 21/0286* (2013.01)
 USPC .......................................... 280/751; 280/750

(58) Field of Classification Search
 CPC .... B60R 21/045; B60R 21/05; B60R 21/055; B60R 21/02; B60R 21/0286; B60R 21/04
 USPC ............................ 280/752, 751, 748; 188/377
 See application file for complete search history.

(56) References Cited

U.S. PATENT DOCUMENTS

| | | | | |
|---|---|---|---|---|
| 3,964,578 | A * | 6/1976 | Campbell et al. | 188/377 |
| 5,518,270 | A * | 5/1996 | Hanada et al. | 280/751 |
| 6,837,518 | B2 * | 1/2005 | Mullan | 280/752 |
| 7,185,917 | B2 * | 3/2007 | Nagata et al. | 280/748 |
| 7,210,704 | B2 * | 5/2007 | Ko | 280/748 |
| 7,913,790 | B2 * | 3/2011 | Tanaka et al. | 180/90 |
| 8,262,131 | B2 * | 9/2012 | Misikir et al. | 280/748 |
| 2005/0062276 | A1 * | 3/2005 | Nagata et al. | 280/752 |
| 2008/0054614 | A1 * | 3/2008 | Drascher et al. | 280/752 |
| 2011/0018247 | A1 * | 1/2011 | Misikir et al. | 280/751 |
| 2012/0125708 | A1 * | 5/2012 | Yamada | 180/443 |
| 2012/0228856 | A1 * | 9/2012 | Arima | 280/751 |
| 2013/0186230 | A1 * | 7/2013 | Fujiwara | 74/560 |
| 2013/0241185 | A1 * | 9/2013 | Tanaka et al. | 280/751 |
| 2013/0249201 | A1 * | 9/2013 | Fujiwara | 280/752 |

FOREIGN PATENT DOCUMENTS

| | | |
|---|---|---|
| JP | 2511352 Y2 | 7/1996 |
| JP | 2009-083747 A | 4/2009 |

* cited by examiner

*Primary Examiner* — Karen Beck
(74) *Attorney, Agent, or Firm* — Studebaker & Brackett PC

(57) ABSTRACT

A knee bolster comprises a curved arm projecting rearward from its one end portion and extending downward in a side view, the other end portion of which is configured as a free end, an inside arm provided inside the curved arm and interconnecting an upper portion and a lower portion of the curved arm, and an impact absorbing member arranged at the other end portion of the curved arm so as to be deformable when the curved arm is deformed by receiving an impact load so that the impact absorbing member is caught between the curved arm deformed and a vehicle-body-side member attached to a vehicle-body member. Accordingly, a load from a knee of a passenger moving forward in a vehicle collision can be received surely and the collision impact can be absorbed properly, thereby protecting the passenger's knee effectively, avoiding improper interference with any surrounding components.

11 Claims, 8 Drawing Sheets

KNEE BOLSTER OF VEHICLE

BACKGROUND OF THE INVENTION

The present invention relates to a knee bolster of a vehicle to protect a knee of a passenger in a vehicle collision.

As disclosed in Japanese Patent Laid-Open Publication No. 2009-83747 or Japanese Utility-Model Registration No. 2511352, for example, a knee bolster (knee protector) to protect a knee of a passenger in a vehicle collision is provided in front of a lower portion of an instrument panel of an automotive vehicle so as to receive the passenger's knee, absorbing an impact.

Specifically, the knee bolster disclosed in the above-described first publication is formed in a hat shape in a side view such that a rearward-protrusion portion is formed at a middle portion, in a vertical direction, of that. Upper and lower end portions of the knee bolster are respectively fixed to a pair of upper-and-lower instrument panel members which is provided in front of an instrument panel and extends in a vehicle width direction. According to the structure of this publication, the knee bolster firmly supported at the two instrument panel members can receive a load from the passenger's knee in the vehicle collision surely, so that the knee bolster can absorb a collision impact through deformation of the above-described protrusion portion thereof. Thereby, protecting the passenger's knee is achieved.

Meanwhile, the knee bolster disclosed in the above-described second publication comprises an impact absorbing member attached to a steering column and a reception-face portion attached to a rear end portion of the impact absorbing member. Likewise, according to the structure of this publication, the knee bolster can surely receive the load from the passenger's knee in the vehicle collision at the reception-face portion, thereby absorbing the collision impact through deformation of the impact absorbing member, whereby the passenger's knee can be protected.

However, since the technology disclosed in the first publication premises that the instrument panel member as a vehicle-body member, to which the knee bolster is fixed, is comprised of a pair of upper-and-lower members, application of this technology may be limited to this kind of vehicle only.

In a case where the technology disclosed in the second publication is applied, the impact absorbing member attached to the steering column may improperly interfere with any components provided to surround the steering column, such as a drive unit of an electromotive power steering mechanism, a car audio, a car navigation and a coin box, or any attaching brackets of such components. Accordingly, there is a problem in that this technology may not be used properly in this situation.

SUMMARY OF THE INVENTION

An object of the present invention is to provide a knee bolster of a vehicle which can surely receive the load from the knee of the passenger moving forward in the vehicle collision and absorb the collision impact properly, thereby protecting the passenger's knee effectively, avoiding improper interference with any surrounding components provided in front of the instrument panel.

According to the present invention, there is provided a knee bolster of a vehicle, which is provided in front of an instrument panel and receives an impact load from a knee of a passenger via the instrument panel, comprising a curved arm, one end portion of which is fixed to a vehicle-body member, the curved arm projecting rearward from the one end portion thereof and extending downward so as to form a curved portion thereof in a side view, the other end portion of the curved arm being configured as a free end, an inside arm provided inside the curved portion of the curved arm so as to form a space portion between the inside arm and the curved portion of the curved arm, the inside arm interconnecting an upper portion and a lower portion of the curved arm, and an impact absorbing member arranged at the other end portion of the curved arm, the impact absorbing member being configured to be deformable when the curved arm is deformed by receiving the impact load so that the impact absorbing member is caught between the curved arm deformed and a vehicle-body-side member attached to the vehicle-body member.

According to the present invention, since the knee bolster provided in front of the instrument panel comprises the curved arm which projects rearward from its upper end portion fixed to the vehicle-body member and extends downward so as to form its curved portion in the side view, when receiving an impact load from the knee of the passenger moving forward via the instrument panel in a vehicle collision, the knee bolster can absorb a collision impact at the curved portion being deformed. Herein, since the rigidity of the curved portion of the curved arm is increased by the inside arm interconnecting the upper portion and the lower portion of the curved arm, the curved portion can be restrained from being deformed excessively. Accordingly, both receiving the impact load and absorbing the impact by the curved portion of the curved arm can be achieved effectively.

Further, the lower end portion of the curved arm is configured as a free end, so that the curved arm is supported at the vehicle-body member through one-sided support. However, when the curved arm is deformed by the impact load from the passenger's knee, the lower end portion of the curved arm is received by the vehicle-body-side member via the impact absorbing member. Thereby, the rigidity of the curved arm can be ensured sufficiently even if the curved arm is supported through one-sided support, so that the knee of the passenger moving forward can be received surely by the curved arm.

Also, at this moment, the impact absorbing member provided at the free-end portion of the curved arm get caught between the curved arm and the vehicle-body-side member and then deformed, so that the collision impact can be also absorbed effectively at the lower end portion of the free end of the curved arm. Accordingly, both receiving the impact load and absorbing the impact can be achieved effectively by the lower end portion of the curved arm as well as the curved portion of the curved arm.

As described above, both the curved portion of the curved arm which is located relatively upward and the impact absorbing member which is located relatively downward are used for receiving the impact load and absorbing the impact according to the present invention, so that the curved portion of the curved arm functions mainly when the height of the passenger's knee is relatively high, whereas the impact absorbing member functions mainly when the height of the passenger's knee is relatively low. Thus, the passenger's knee can be effectively protected regardless of the size or position of the passenger.

Moreover, since the curved arm is arranged in a state of the one-sided support as described above, the knee bolster can be arranged, easily avoiding any interference of the curved arm with any surrounding components, despite the structure in front of the instrument panel. Accordingly, a properly-flexible layout of any components provided to surround the knee bolster, such as a drive unit of an electromotive power steering mechanism, a car audio, a car navigation and a coin box, or any attaching brackets of such components can be achieved.

According to an embodiment of the present invention, the vehicle-body-side member is positioned inside the curved arm and in front of the inside arm, and the other end portion of the curved arm as the free end is positioned in back of the vehicle-body-side member. Thereby, the vehicle-body-side member (any components provided to surround the knee bolster, such as a drive unit of an electromotive power steering mechanism, a car audio, a car navigation and a coin box, or any attaching brackets of such components) can be properly and compactly arranged by utilizing a curve shape of the curved arm, ensuring the above-described functions of receiving the impact load and absorbing the impact achieved by the curved arm and the impact absorbing member.

According to another embodiment of the present invention, the inside arm includes a bending portion at a middle portion thereof, which projects toward the curved portion of the curved arm in the space portion and is configured to be deformable so as to contact an inside portion of the curved portion of the curved arm when the curved arm is deformed by receiving the impact load. Thereby, the curved portion can be properly restrained from being deformed excessively by its contact with the bending portion of the inside arm, so that the impact load can be further surely received by the curved portion of the curved arm.

According to another embodiment of the present invention, the vehicle-body member is an instrument panel member extending in a vehicle width direction, a steering column including a steering shaft therein is attached to the instrument panel member, and the vehicle-body-side member is a drive unit for assisting a rotation of the steering shaft which is fixed to the steering column. Thereby, receiving the impact load and absorbing the impact can be achieved at the lower end portion of the free end of the curved arm by utilizing the drive unit fixed to the steering column.

According to another embodiment of the present invention, the drive unit comprises a cylindrical case to accommodate a motor therein, and the impact absorbing member is provided to be contactable with an outer peripheral face of the cylindrical case of the drive unit when the curved arm is deformed by receiving the impact load. Thereby, since the impact absorbing member contacts the outer peripheral face of the cylindrical case having a high rigidity of the drive unit, the impact load can be much further surely received by the curved portion of the curved arm.

According to another embodiment of the present invention, the curved arm is comprised of plural arms which are arranged with a specified distance therebetween in a vehicle width direction, and the plural arms are interconnected by a connecting arm. Thereby, a reception width of the impact load by the knee bolster is enlarged properly in the vehicle width direction, so that the passenger's knee can be further securely protected.

Other features, aspects, and advantages of the present invention will become apparent from the following description which refers to the accompanying drawings.

DETAILED DESCRIPTION OF THE INVENTION

Hereafter, a preferred embodiment of the present invention will be descried specifically referring to the accompanying drawings. In the following descriptions, the terms regarding directions, such as "front", "rear", "longitudinal", "left", "right", or "lateral", mean respective directions in a state where a vehicle's traveling direction is set as a "front" direction, except particular cases with notes.

A surrounding structure of a knee bolster 30 in front of an instrument panel 1 according to the present embodiment will be described first referring to a perspective view of FIG. 1, a back view of FIG. 2 and a side view of FIG. 3.

Figure 1:
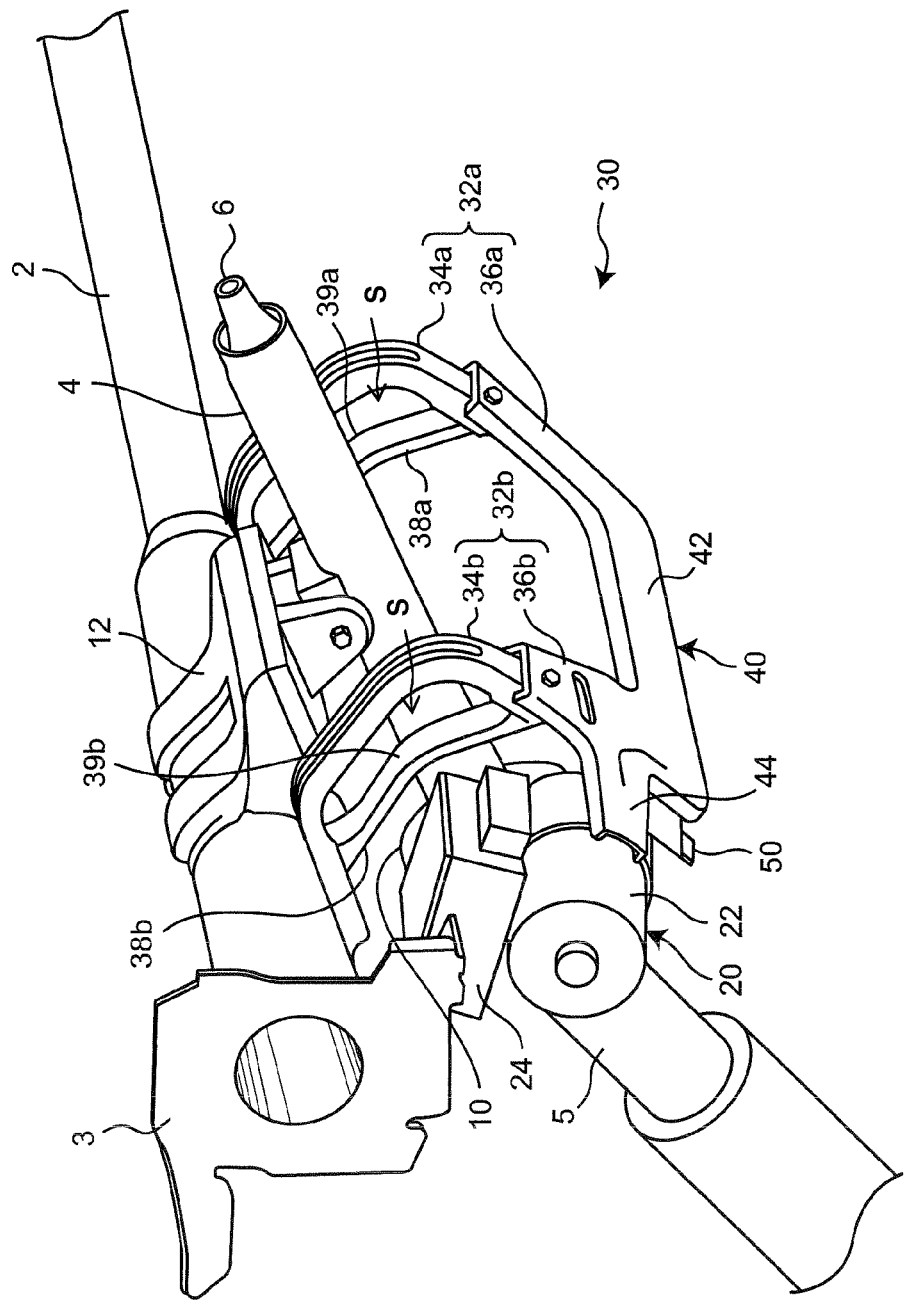
FIG. 1 is a perspective view showing a knee bolster of a vehicle and its surrounding structure according to an embodiment of the present invention.
Figure 2:
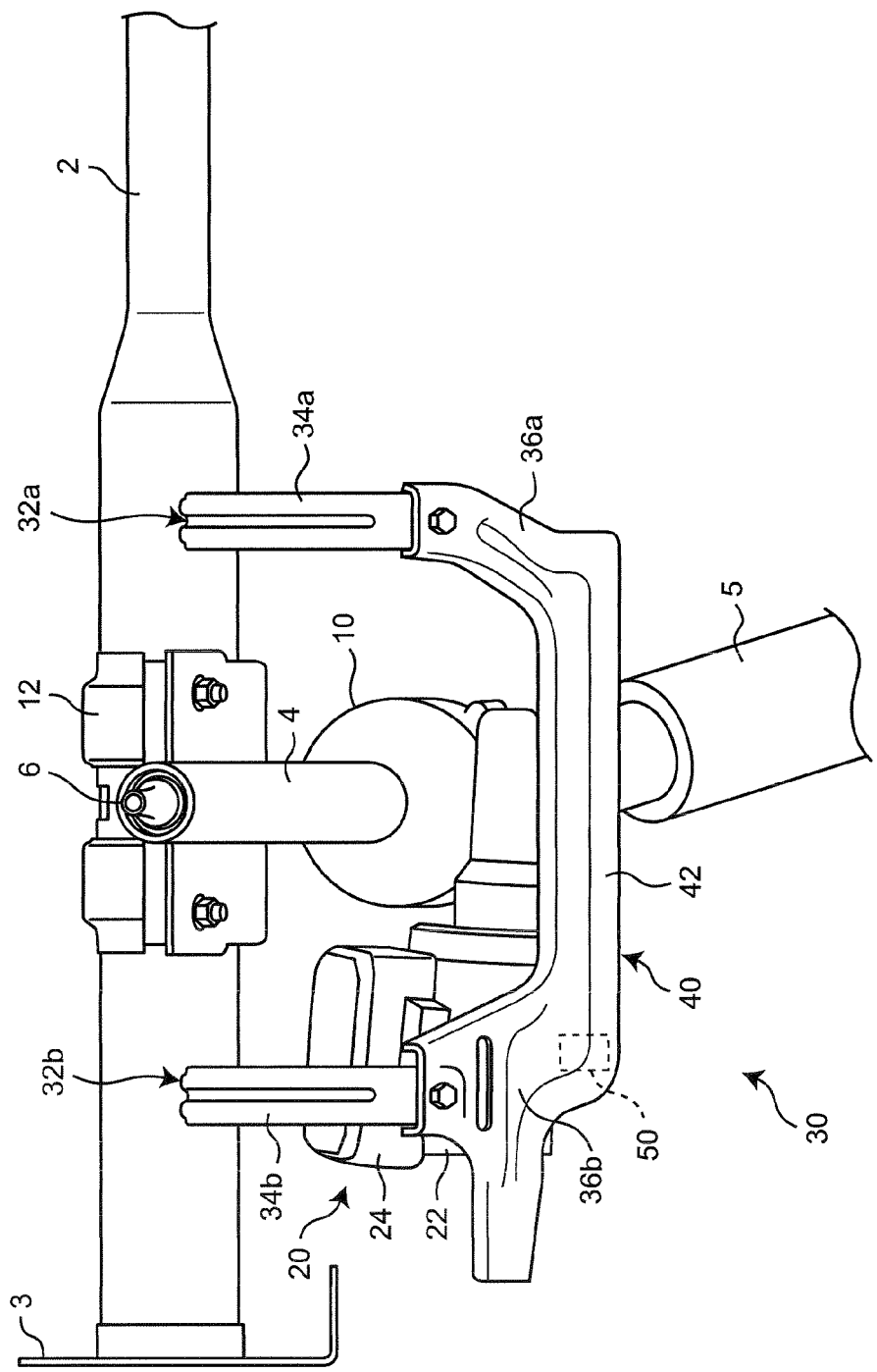
FIG. 2 is a back view of the knee bolster of a vehicle and its surrounding structure shown in FIG. 1, when viewed from a rear side.
Figure 3:
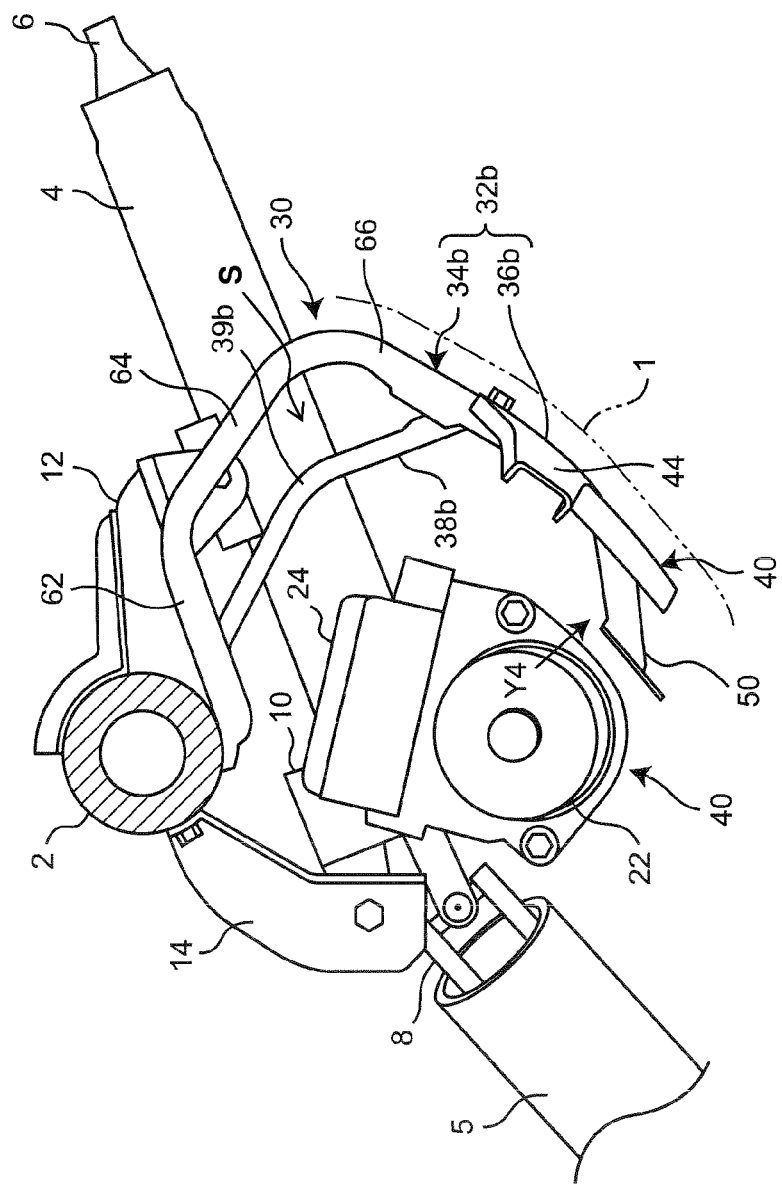
FIG. 3 is a side view of the knee bolster of a vehicle and its surrounding structure shown in FIG. 1, when viewed from a left side in a vehicle width direction.

Herein, in FIGS. 1 and 2, an illustration of the instrument panel 1 is omitted in order to help understanding of the present invention, and in FIG. 3, part of the instrument panel 1 is illustrated by using a two-dotted broken line. While the knee bolster 30 of the present embodiment is provided in front of a driver's seat to protect a knee 100 of a passenger seated in the driver's seat, the present invention can be also applied to any knee bolster provided in front of an assistant seat (a passenger seat). Further, while the present embodiment described here is applied to a vehicle equipped with a steering wheel arranged on the left side, the present invention is applicable to any vehicle with a steering wheel arranged on the right as well.

As shown in FIGS. 1-3, an instrument panel member 2 which extends in a vehicle width direction is provided in front of the instrument panel 1. A pair of plate-shaped brackets 3 is provided at both end portions of the instrument panel member 2. A hinge pillar, not illustrated, is fixed to each of the brackets 3, whereby the instrument panel member 2 is attached between right-and-left hinge pillars.

An upper steering column 4 is fixed to the instrument panel member 2 via brackets 12, 14. The upper steering column 4 is provided to project rearward and upward, penetrating the instrument panel 1. An upper steering shaft 6 is arranged inside the upper steering column 4, and a steering wheel (handle), not illustrated, is attached to an upper end portion of the upper steering shaft 6. Meanwhile, a lower end portion of the upper steering shaft 6 is coupled via a universal joint 8 to a lower steering shaft, not illustrated, which is arranged inside a lower steering column 5.

A joint portion 10 is provided at a lower end portion of the upper steering column 4, and a drive unit 20 of an electromotive power steering mechanism to assist the rotation of the upper steering shaft 6 is coupled to the joint portion 10.

The drive unit 20 comprises a cylindrical case 22 which accommodates a motor as a drive source therein and a boxy case 24 which accommodates a control portion to control a drive of the motor therein.

The cylindrical case 22 which extends substantially in the vehicle width direction is arranged below the instrument member 2 on the left side of the lower end portion of the upper steering column 4, and fixed to the joint portion 10 of the upper steering column 4. The boxy case 24 is arranged above and fixed to the cylindrical case 22.

Hereinafter, the knee bolster 30 of the present embodiment will be described.

Figure 6:
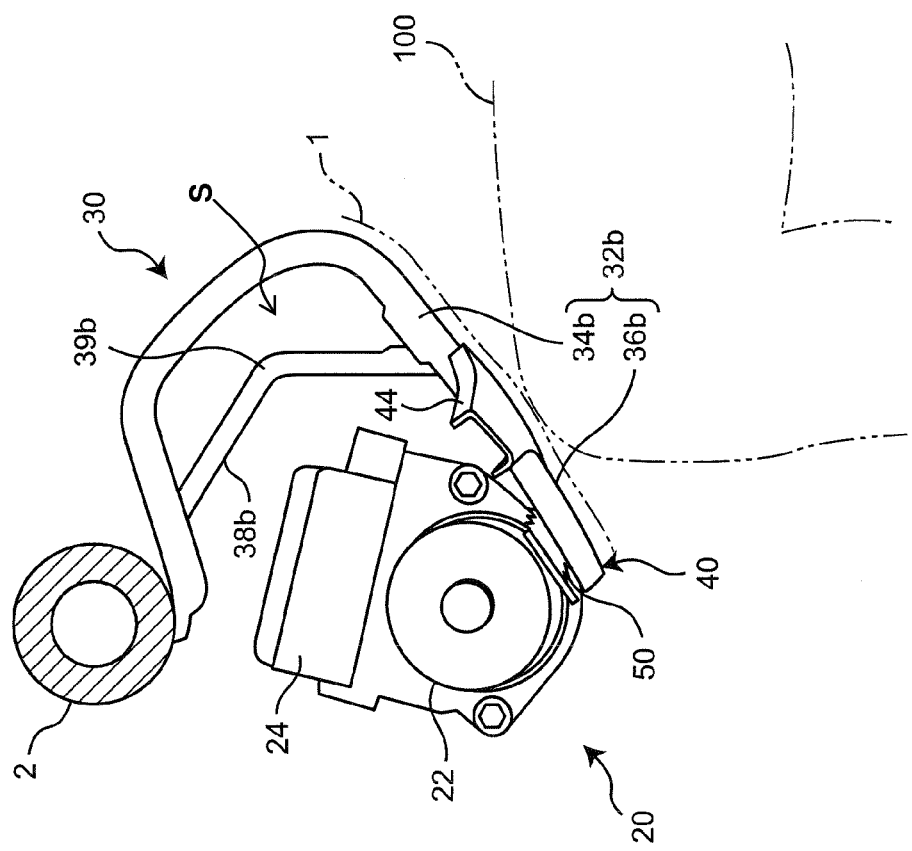
FIG. 6 is a side view showing a state in which an impact load from a knee of a passenger is received by the knee bolster of a vehicle shown in FIG. 1 at a relatively low position.
Figure 8:
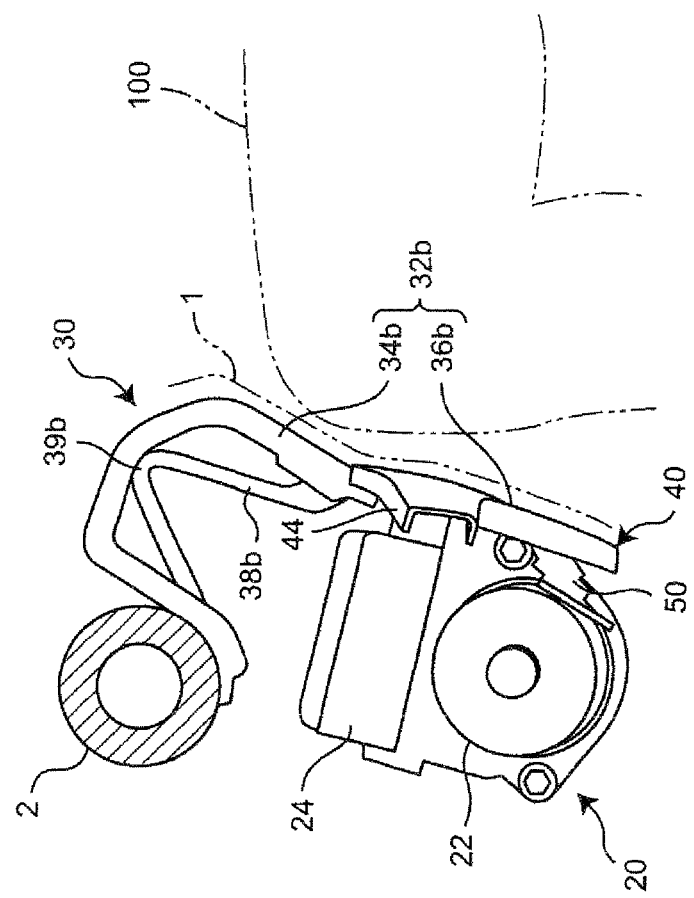
FIG. 8 is a side view showing a state in which the impact load from the knee of the passenger is received by the knee bolster of a vehicle shown in FIG. 1 at a relatively high position.

As shown in FIGS. 6 and 8, the knee bolster 30 is arranged in front of the instrument panel 1, and receives an impact load from a knee 100 of a passenger moving forward in a vehicle collision via the instrument panel 1 and absorbs the impact.

As shown in FIGS. 1-3, the knee bolster 30 comprises a pair of right-and-left curved arms 32 (32a, 32b) which are arranged with a specified distance in the vehicle width direction and a connecting arm 42 which interconnects the curved arms 32.

The right-side curved arm 32a is arranged substantially in front of a right leg of the passenger seated in the driver's seat, and the left-side curved arm 32b is arranged substantially in front of a left leg of the passenger seated in the driver's seat. The right-and-left curved arms 32a, 32b are located substantially at the same level. The connecting arm 42 is positioned at the level which is substantially equal to, or lower than the height of the knee of the passenger seated in the driver's seat.

The curved arms 32 comprise, respectively, curved portions 34 (34a, 34b) which project rearward from one end portions thereof and extend downward, and lower extension portions 36 (36a, 36b) which extend downward from lower ends of the curved portions 34. In the present embodiment, the curved portion 34 and the lower extension portion 36 are comprised of different members, and a lower end portion of the curved portion 34 and an upper end portion of the lower extension portion 36 are fixed to each other via bolts, for example.

The one end portion of the curved arm 32, that is, an upper end portion of the curved portion 34 is provided to partially wind around a lower portion of an outer peripheral face of the instrument panel member 2, and fixed to the instrument panel member 2 at this winding portion by welding, for example.

The curved portion 34 comprises, as shown in FIG. 3, a first straight-extension portion 62 which extends slightly upward and rearward from the above-described upper end portion, a second straight-extension portion 64 which extends downward and rearward from a rear end portion of the first straight-extension portion 62, and a third straight-extension portion 66 which extends downward and forward from a rear end portion of the second straight-extension portion 64. The curved portion 34 is formed to curve upward and rearward as a whole, having these first through third straight-extension portions 62, 64, 66.

The lower extension portion 36 of the curved arm 32 extends forward and downward, being continuous from the third straight-extension portion 66 of the curved portion 34, and a lower end portion of the lower extension portion 36, that is, a lower end portion of the curved arm 32 is configured as a free end. Thus, the curved arm 32 is supported through one-sided support, so that some surrounding components can be properly arranged inside the curved arm 32 without any improper interference. Specifically, the above-described drive unit 20, for example, can be properly arranged inside the curved arm 32 without any improper interference. Thus, according to the knee bolster 30 of the present embodiment, a properly-flexible layout of any surrounding components can be achieved, avoiding any interference of the knee bolster 30 with such surrounding components.

As shown in FIGS. 1 and 2, the above-described connecting arm 42 constitutes a lower connecting member 40, together with the right-and-left lower extension portions 36a, 36b. The connecting arm 42 according to the present embodiment is provided to extend in the vehicle width direction, interconnecting respective lower end portions of the right-and-left lower extension portions 36a, 36b. However, the connecting arm 42 may be provided to extend in the vehicle width direction, interconnecting respective middle portions of the right-and-left lower extension portions 36a, 36b. Further, the lower connecting member 40 has a projecting piece 44 which projects outward, in the vehicle width direction, from a middle portion of the left-side lower extension portion 36a.

According to the structure described above, when the passenger seated in the driver's seat moves forward in the vehicle collision, the load from the knee 100 of the right leg of the passenger is received mainly by the right-side curved arm 32a, and the knee 100 of the left leg of the passenger is received mainly by the left-side curved arm 32b. Herein, since the right-and-left curved arms 32a, 32b are interconnected by the connecting arm 42, a reception width of the impact load by the knee bolster 30 is enlarged properly in the vehicle width direction. Thereby, even if the knee 100 of the passenger is located between the right-and-left curved arms 32 in the vehicle width direction, for example, the load from the knee 100 can be received by the curved arms 32 via the connecting arm 42.

When the curved arms 32 receive the impact load from the knee 100 as described above, the curved portions 34 of the curved arms 32 are deformed, thereby absorbing the impact. However, if the rigidity of the curved arms 32 is too low, the load from the passenger's knee 100 may not be received surely, so that the impact may not be absorbed properly.

Therefore, according to the present embodiment, as shown in FIGS. 1 and 3, respective upper portions and respective lower portions of the curved portions 34 of the curved arms 32 are interconnected by inside arms 38 (38a, 38b) which are provided inside the curved portions 34 of the curved arms 32 so as to form space portions S between the inside arms 38 and the curved portions 34. Specifically, each of the inside arms 38 is provided to interconnect a middle portion of the first straight-extension portion 62 and a lower end portion of the third straight-extension portion 66 of the curved portion 34. The rigidity of the curved arm 32 is increased by the inside arm 38.

The inside arms 38 include bending portions 39 (39a, 39b) at middle portions thereof, which project toward middle portions of the second straight-extension portions 64 of the curved portions 34.

When the curved arms 32 receive the impact load from the passenger's knee 100, the bending portions 39 of the inside arms 38 is deformed, increasing a bending angle thereof and approaching the second straight-extension portions 64 of the curved portions 34, in accordance with the curved portions 34 being deformed so as to narrow the distance between the upper end portions and the lower end portions thereof in the side view. Herein, the bending portions 39 are configured so as to contact with inside portions of the curved portions 34, depending on a situation of impact. Thereby, once the bending portions 39 contact with the inside portions of the curved portions 34, any further deformations of the curved portions 34 are restrained. Accordingly, the curved portions 34 can be restrained from being deformed excessively, so that both receiving the impact load and absorbing the impact by the curved portions 34 of the curved arms 32 can be achieved effectively.

Further, an impact absorbing member 50 is arranged at the lower end portion of the left-side curved arm 32*b*. The impact absorbing member 50 is configured to be deformable when the impact absorbing member 50 is caught between the curved arm 32*b* which is deformed by the impact load from the passenger's knee 100 and the drive unit 20 as a vehicle-body-side member.

Figure 4:
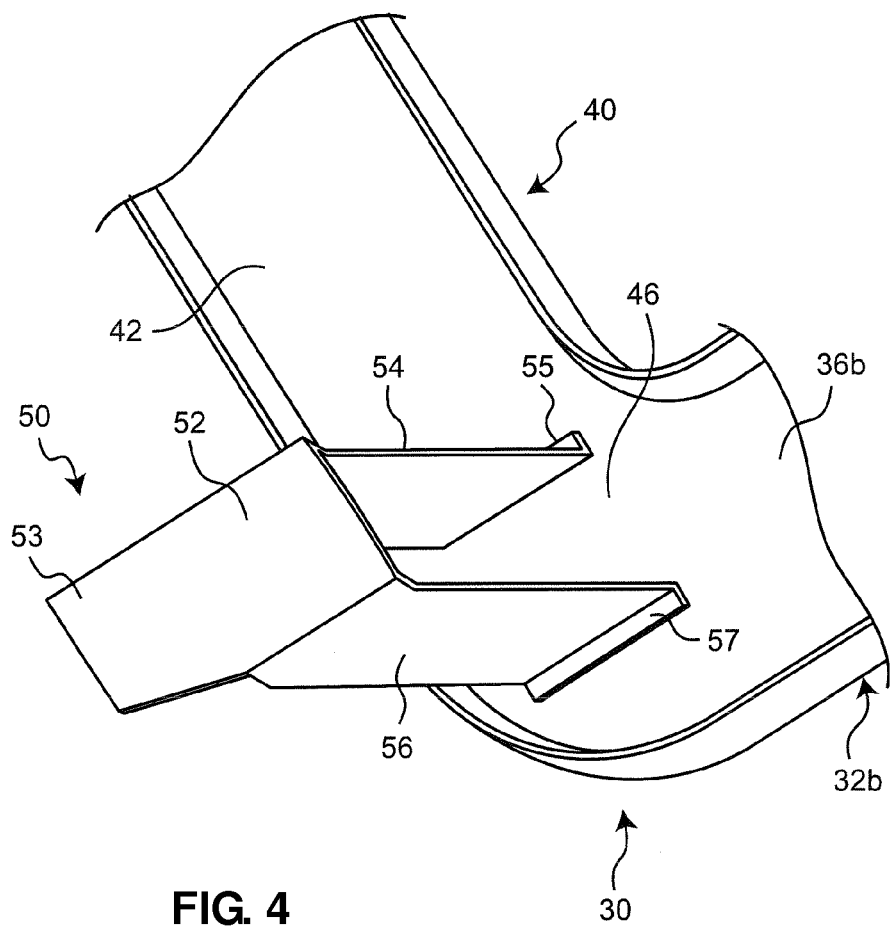
FIG. 4 is a perspective view of an impact absorbing member provided at the knee bolster of a vehicle shown in FIG. 1, when viewed from an upper and front side.

The impact absorbing member 50 comprises, as shown in FIG. 4, a pair of right-and-left fixation face portions 55, 57 which is fixed, by welding for example, to a lower end portion of the curved arm 32*b* of the lower connecting member 40, specifically, to a front face of a corner portion 46 of the left-side lower extension portion 36*b* and the connecting arm 42, a pair of right-and-left leg portions 54, 56 which rises from the fixation face portions 55, 57, and a contact face portion 52 which extends between the right-and-left leg portions 54, 56. The contact face portion 52 is arranged to face to an outer peripheral face of the cylindrical case 22 of the drive unit 20. Further, this contact face portion 52 has an extension portion 53, which extends downward from a portion extending between the right-and-left leg portions 54, 56 so as to enlarge an area of the contact face portion 52.

Thus, the contact face portion 52 of the impact absorbing member 50 is configured to be contactable with the outer peripheral face of the cylindrical case 22 having a high rigidity in a case where the lower end portion of the curved arm 32*b* is deformed so as to move forward, when receiving the impact load from the knee 100 of the passenger moving forward. Accordingly, the impact load is received by the cylindrical case 22 via the impact absorbing member 50 despite the free end of the lower end portion of the curved arm 32. Thus, the rigidity large enough to receive the impact load is ensured.

Further, at this moment, the impact absorbing member 50 gets caught between the cylindrical case 22 and the curved arm 32*b*, especially, the leg portions 54, 56 get deformed like crushing, so that the impact can be absorbed by the impact absorbing member 50. Thus, by utilizing the cylindrical case 22 of the drive unit 20, both receiving the impact load and absorbing the impact can be achieved effectively by the lower end portion of the free end of the curved arm 32*b* as well as the curved portion 34.

Figure 5:
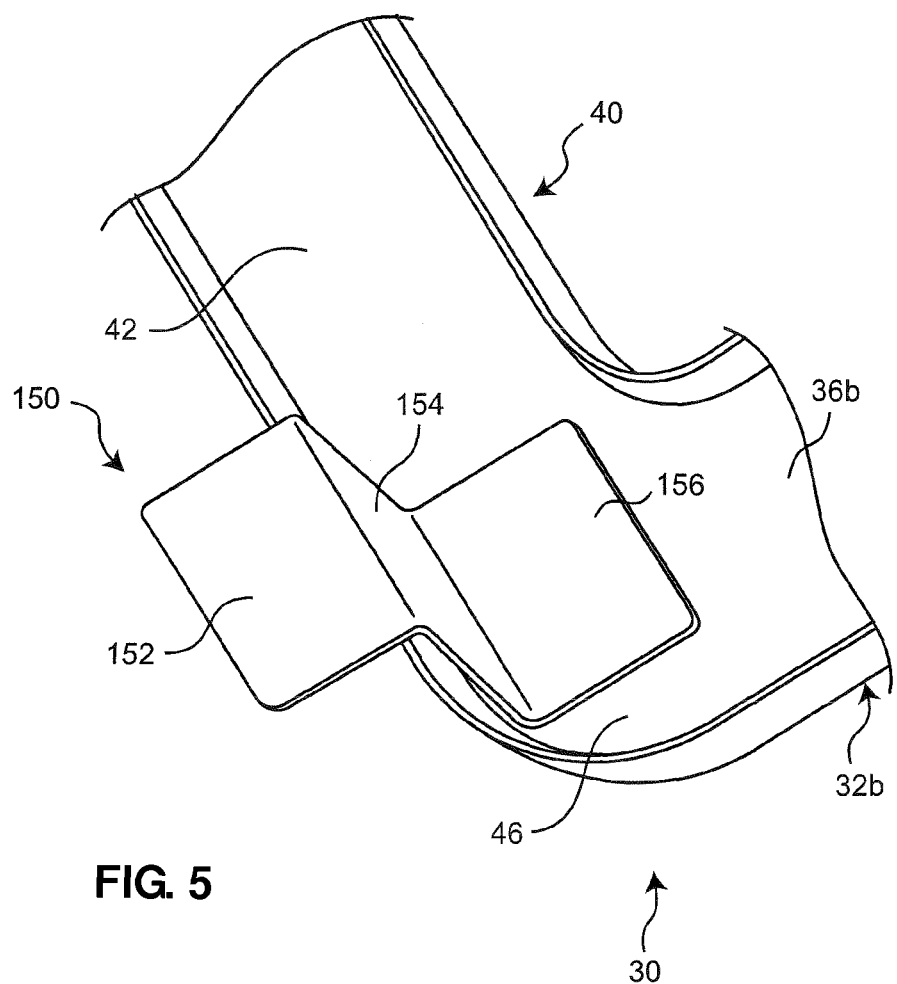
FIG. 5 is a perspective view of a modification of the impact absorbing member, when viewed from the same direction as FIG. 4.

Herein, various structures of the impact absorbing member are applicable instead of the above-described impact absorbing member 50, such as an impact absorbing member 150 shown in FIG. 5, according to the present invention. The impact absorbing member 150 shown in FIG. 5 comprises a fixation face portion 156 which is fixed, by welding for example, to the lower end portion of the curved arm 32*b*, a contact face portion 152 which is arranged to face to the outer peripheral face of the cylinder case 22 of the drive unit 20, and a connecting face portion 154 which interconnects the contact face portion 152 and the fixation face portion 156, which is formed stepwise as a whole. When receiving the impact load from the knee 100 of the passenger moving forward, the contact face portion 152 contacts the outer peripheral face of the cylinder case 22 of the drive unit 20, and the connecting face portion 154 gets deformed like crushing. Thereby, both receiving the impact load and absorbing the impact can be achieved similarly.

Figure 7A:
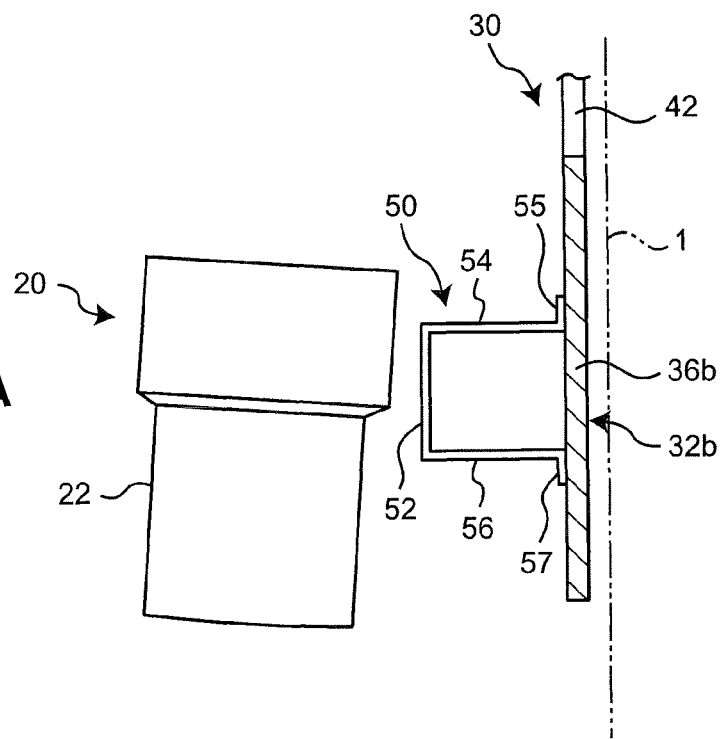
FIGS. 7A and 7B are plan views schematically showing the impact absorbing member and its surrounding in a normal state and in an impact-load-reception state similar to FIG. 6, respectively.
Figure 7B:
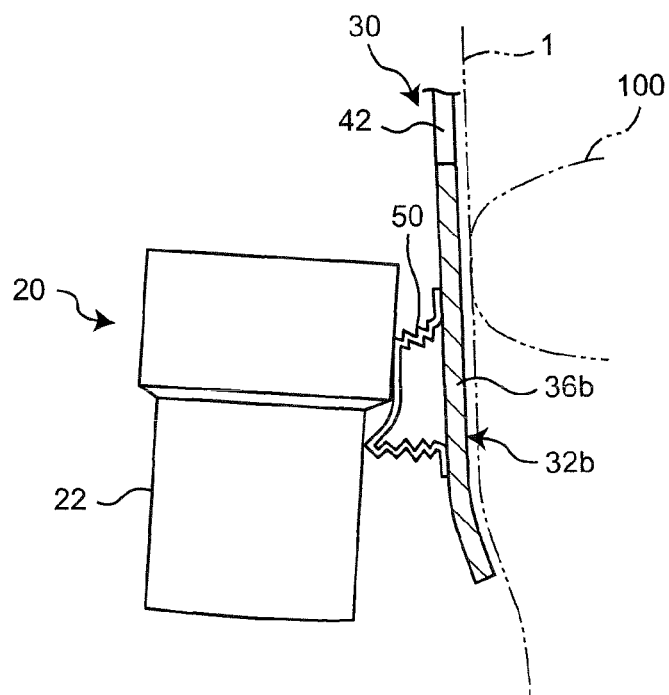

FIG. 6 is a side view showing a state in which the impact load from the knee 100 of the passenger is received by the knee bolster 30 at a relatively low position. FIG. 7A is a plan view schematically showing the impact absorbing member 50 and its surrounding in a normal state in which no impact load is received, and FIG. 7B is a plan view schematically showing the impact absorbing member 50 and its surrounding in the state shown in FIG. 6.

In the state shown in FIG. 6, since the passenger's knee 100 contacts the lower end portion of the curved arms 32 via the instrument panel 1, the deformation of the curved portions 34 located above the knee 100 is relatively small. Meanwhile, in this state, the impact absorbing member 50 located substantially at the same level as the knee 100 is caught between the lower end portion of the curved arms 32 and the cylindrical case 22 of the drive unit 20 and crushed, as shown in FIG. 7B, so that the impact absorbing member 50 is deformed largely, falling down outward in the vehicle width direction. That is, in this case, the effective impact absorption can be achieved mainly by the impact absorbing member 50.

FIG. 8 is a side view showing a state in which the impact load from the knee 100 of the passenger is received by the knee bolster 30 at a relatively high position.

In the state shown in FIG. 8, since the passenger's knee 100 contacts the curved portions 34 of the curved arms 32 via the instrument panel 1, the deformation of the impact absorbing member 50 located below the knee 100 is relatively small. Meanwhile, in this state, the curved arms 34 hitting against the knee 100 are deformed relatively largely. Further, since the bending portions 39 of the inside arms 38 contact the inside portions of the curved portions 34, the curved portions 34 are restrained from being deformed excessively. Thereby, the impact load can be received surely by the curved portions 34. Accordingly, the effective impact absorption can be achieved mainly by the curved portions 34 in this case.

As described above, both the curved portions 34 which are located relatively upward and the impact absorbing member 50 which is located relatively downward are used for receiving the impact load and absorbing the impact according to the present embodiment, so that the curved portions 34 function mainly when the height of the passenger's knee 100 is relatively high, and the impact absorbing member 50 functions mainly when the height of the passenger's knee 100 is relatively low. Thus, the passenger's knee 100 can be effectively protected regardless of the size or position of the passenger.

The present invention should not be limited to the above-described embodiment, and any other modifications or improvements may be applied within the scope of a sprit of the present invention.

For example, while the upper end portion of the knee bolster is fixed to the instrument panel member in the above-described embodiment, the present invention is applicable to a case in which the upper end portion of the knee bolster is fixed to any vehicle-body member other than the instrument panel member.

Further, while the vehicle-body member to receive the impact absorbing member is the drive unit of the electromotive power steering mechanism in the above-described embodiment, the present invention is applicable to any other member, such as any drive unit used for various mechanism other than the electromotive power steering mechanism, a car audio, a car navigation and a coin box, or any attaching brackets of such components.

Also, while the above-described embodiment shows the case in which the impact absorbing member is provided at the lower end portion of the left-side curved arm, the impact absorbing member may be provided at the lower end portion of the right-side curved arm or lower end portions of the both of the right-and-left curved arms.

Moreover, while the above-described embodiment shows the case in which the knee bolster is comprised of a pair of right-and-left curved arms, the knee bolster may be comprised of a single curved arm or three or more curved arms.

Additionally, while the above-described embodiment shows the case in which the curved arm is comprised of two members, i.e., the curved portion and the lower extension portion, the curved arm may be comprised of a single member or three or more members.

What is claimed is:

1. A knee bolster of a vehicle, which is provided in front of an instrument panel and receives an impact load from a knee of a passenger via the instrument panel, wherein a vehicle component's member is provided in front of an instrument panel separately from the knee bolster, the knee bolster comprising:
    a curved arm, one end portion of which is fixed to a vehicle-body member, the curved arm projecting rearward from the one end portion thereof and extending downward so as to form a curved portion thereof in a side view, the other end portion of the curved arm being configured as a free end without being fixed to the vehicle-body member;
    an inside arm provided inside said curved portion of the curved arm so as to form a space portion between the inside arm and the curved portion of the curved arm, the inside arm interconnecting an upper portion and a lower portion of said curved arm, the inside arm including a bending portion at a middle portion thereof, which projects rearward toward the curved portion of the curved arm in the space portion and is configured to be deformable so as to contact an inside portion of the curved portion of the curved arm when the curved arm is deformed by receiving the impact load; and
    an impact absorbing member arranged at the other end portion of said curved arm, the impact absorbing member projecting toward said vehicle component's member from the other end portion of the curved arm without contacting the vehicle component's member, the impact absorbing member being configured to be deformable, when said curved arm is deformed by receiving said impact load, so as to contact the vehicle component's member and crush between the other end of the curved arm deformed and the vehicle component's member,
    wherein said knee bolster is arranged, in the side view, relative to said vehicle component's member such that the vehicle component's member is located in a space which is formed in front of the knee bolster by being enclosed by the upper portion of said curved arm, said inside arm, and the lower portion of the curved arm.

2. The knee bolster of a vehicle of claim 1, wherein said vehicle-body member is an instrument panel member extending in a vehicle width direction, a steering column including a steering shaft therein is attached to the instrument panel member, and said vehicle component's member is a drive unit for assisting a rotation of said steering shaft which is fixed to said steering column.

3. The knee bolster of a vehicle of claim 2, wherein said drive unit comprises a cylindrical case to accommodate a motor therein, and said impact absorbing member is provided to be contactable with an outer peripheral face of said cylindrical case of the drive unit when the curved arm is deformed by receiving the impact load.

4. The knee bolster of a vehicle of claim 1, wherein said curved arm is comprised of plural arms which are arranged with a specified distance therebetween in a vehicle width direction, and said plural arms are interconnected by a connecting arm.

5. A knee bolster of a vehicle, which is provided in front of an instrument panel and receives an impact load from a knee of a passenger via the instrument panel, wherein a vehicle component's member is provided in front of an instrument panel separately from the knee bolster, the knee bolster comprising:
    a pair of curved arms arranged with a specified distance therebetween in a vehicle width direction, each of one end portions of which is fixed to a vehicle-body member, each of the curved arms projecting rearward from the one end portion thereof and extending downward so as to form a curved portion thereof in a side view, each of the other end portions of the curved arms being configured as a free end without being fixed to the vehicle-body member;
    a pair of inside arms, each of the inside arms being provided inside said curved portion of the curved arm so as to form a space portion between the inside arm and the curved portion of the curved arm, each of the inside arms interconnecting an upper portion and a lower portion of said curved arm, each of the inside arms including a bending portion at a middle portion thereof, which projects rearward toward the curved portion of the curved arm in the space portion and is configured to be deformable so as to contact an inside portion of the curved portion of the curved arm when the curved arm is deformed by receiving the impact load;
    a connecting arm interconnecting said pair of curved arms; and
    an impact absorbing member arranged at the other end portion of any of said curved arms, the impact absorbing member projecting toward said vehicle component's member from the other end portion of any of the curved arms without contacting the vehicle component's member, the impact absorbing member being configured to be deformable, when said curved arms are deformed by receiving said impact load, so as to contact the vehicle component's member and crush between the other end of any of the curved arms deformed and the vehicle component's member,
    wherein said knee bolster is arranged, in the side view, relative to said vehicle component's member such that the vehicle component's member is located in a space which is formed in front of the knee bolster by being enclosed by the upper portion of any of said curved arms, any of said inside arms, and the lower portion of said any of the curved arms.

6. A knee bolster of a vehicle, which is provided in front of an instrument panel and receives an impact load from a knee of a passenger via the instrument panel, wherein a vehicle component's member is provided in front of an instrument panel separately from the knee bolster, the knee bolster comprising:
    a pair of curved arms arranged with a specified distance therebetween in a vehicle width direction, each of one end portions of which is fixed to a vehicle-body member, each of the curved arms projecting rearward from the one end portion thereof and extending downward so as to form a curved portion thereof in a side view, each of the other end portions of the curved arms being configured as a free end without being fixed to the vehicle-body member;
    a pair of inside arms, each of the inside arms being provided inside said curved portion of the curved arm so as to form a space portion between the inside arm and the curved portion of the curved arm, each of the inside arms interconnecting an upper portion and a lower portion of said curved arm, each of the inside arms including a bending portion at a middle portion thereof, which projects rearward toward the curved portion of the curved arm in the space portion and is configured to be deformable so as to contact an inside portion of the curved portion of the curved arm when the curved arm is deformed by receiving the impact load;

a connecting arm interconnecting said pair of curved arms; and an impact absorbing member arranged at the other end portion of any of said curved arms, the impact absorbing member projecting toward said vehicle component's member from the other end portion of any of the curved arms without contacting the vehicle component's member, the impact absorbing member being configured to be deformable, when said curved arms are deformed by receiving said impact load, so as to contact the vehicle component's member and crush between the other end of any of the curved arms deformed and the vehicle component's member, wherein said knee bolster is arranged, in the side view, relative to said vehicle component's member such that the vehicle component's member is located in a space which is formed in front of the knee bolster by being enclosed by the upper portion of any of said curved arms, any of said inside arms, and the lower portion of said any of the curved arms, said vehicle-body member is an instrument panel member extending in a vehicle width direction, a steering column including a steering shaft therein is attached to the instrument panel member, and said vehicle component's member is a drive unit for assisting a rotation of said steering shaft which is fixed to said steering column and comprises a cylindrical case to accommodate a motor therein, said impact absorbing member is provided to be contactable with an outer peripheral face of said cylindrical case of the drive unit when the curved arms are deformed by receiving the impact load.

7. The knee bolster of a vehicle of claim 1, wherein said impact absorbing member comprises a fixation portion which is fixed relative to the other end portion of the curved arm, a plate portion which rises from the fixation portion toward said vehicle component's member, and a contact face portion which is connected to said plate portion and configured to be contactable with the vehicle component's member, and said plate portion of the impact absorbing member is configured to be crushable.

8. The knee bolster of a vehicle of claim 1, wherein said impact absorbing comprises a pair of fixation portions fixed relative to the other end portion of the curved arm, a pair of crushable plate portions rising from said pair of fixation portions, respectively, and a single contact face portion connected to and extending between said pair of plate portions.

9. The knee bolster of a vehicle of claim 1, wherein said impact absorbing comprises a single fixation portion fixed relative to the other end portion of the curved arm, a single crushable plate portion rising from said single fixation portion, and a single contact face portion connected to said single plate portion.

10. The knee bolster of a vehicle of claim 5, wherein said impact absorbing member comprises a fixation portion which is fixed to said connecting arm, a plate portion which rises from the fixation portion toward said vehicle component's member, and a contact face portion which is connected to said plate portion and configured to be contactable with the vehicle component's member, and said plate portion of the impact absorbing member is configured to be crushable.

11. The knee bolster of a vehicle of claim 6, wherein said impact absorbing member comprises a fixation portion which is fixed to said connecting arm, a plate portion which rises from the fixation portion toward said drive unit vehicle as the vehicle component's member, and a contact face portion which is connected to said plate portion and configured to be contactable with said outer peripheral face of the cylindrical case of the drive unit, and said plate portion of the impact absorbing member is configured to be crushable.

* * * * *